(12) United States Patent
Park

(10) Patent No.: US 9,699,420 B2
(45) Date of Patent: Jul. 4, 2017

(54) METHOD OF CONTROLLING A DOOR REGULATING APPARATUS OF VEHICLE

(71) Applicant: Hyundai Motor Company, Seoul (KR)

(72) Inventor: Sangkyu Park, Seongnam-Si (KR)

(73) Assignee: Hyundai Motor Company, Seoul (KR)

( * ) Notice: Subject to any disclaimer, the term of this patent is extended or adjusted under 35 U.S.C. 154(b) by 577 days.

(21) Appl. No.: 14/139,750

(22) Filed: Dec. 23, 2013

(65) Prior Publication Data

US 2014/0293058 A1 Oct. 2, 2014

(30) Foreign Application Priority Data

Mar. 26, 2013 (KR) .................. 10-2013-0032191

(51) Int. Cl.
*B25J 15/06* (2006.01)
*H04N 7/18* (2006.01)

(52) U.S. Cl.
CPC .............. *H04N 7/183* (2013.01); *B25J 15/06* (2013.01); *B25J 15/0616* (2013.01); *Y10T 29/4978* (2015.01); *Y10T 29/49902* (2015.01)

(58) Field of Classification Search
CPC . B25J 15/06; B25J 15/0616; Y10T 29/49902; Y10T 29/4978
See application file for complete search history.

(56) References Cited

U.S. PATENT DOCUMENTS

| | | | | |
|---|---|---|---|---|
| 2006/0015211 | A1* | 1/2006 | Kolb | B25J 9/1684 700/213 |
| 2007/0017081 | A1 | 1/2007 | Becker et al. | |

FOREIGN PATENT DOCUMENTS

| | | |
|---|---|---|
| CN | 101094785 A | 12/2007 |
| JP | 6-18224 A | 1/1994 |
| JP | 2005-537989 A | 12/2005 |
| KR | 10-2004-0105485 A | 12/2004 |
| KR | 10-2004-0105488 A | 12/2004 |
| KR | 10-1140598 B1 | 9/2006 |

OTHER PUBLICATIONS

KR1020040105485A—translation.*

* cited by examiner

*Primary Examiner* — Sarang Afzali
*Assistant Examiner* — Ruth G Hidalgo-Hernandez
(74) *Attorney, Agent, or Firm* — Morgan, Lewis & Bockius LLP

(57) ABSTRACT

A door regulation apparatus positions a door mounted in a freely rotatably state in a vehicle body at a reference position in a gap/step measuring process, makes a step of a preset portion of the door to zero, and includes: i) a frame installed outside of a vehicle body transfer line; ii) a moving member reciprocating in the frame through a driving unit; iii) a clamping unit installed in the moving member vacuum adsorbs a skin surface of the door; iv) a sensor installed in the clamping unit senses a vacuum pressure operating at the skin surface; v) a vision photographing unit installed in the moving member photographs a preset portion of the door; and iv) a control unit analyzes and processes a sensing signal from the sensor and vision data that acquires from the vision photographing unit to control the driving unit.

4 Claims, 5 Drawing Sheets

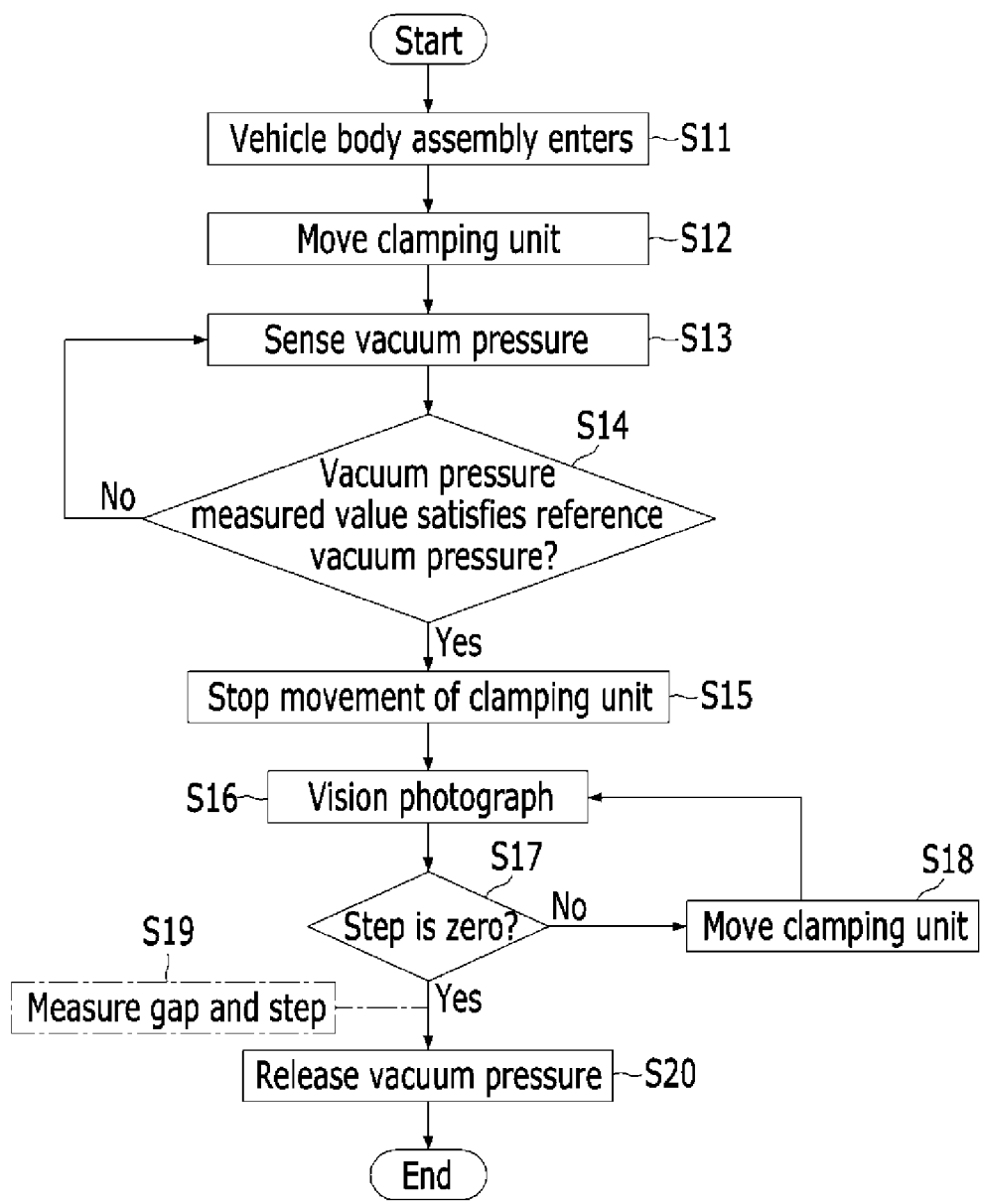

METHOD OF CONTROLLING A DOOR REGULATING APPARATUS OF VEHICLE

CROSS-REFERENCE TO RELATED APPLICATION

The present application claims priority of Korean Patent Application Number 10-2013-0032191 filed Mar. 26, 2013, the entire contents of which application is incorporated herein for all purposes by this reference.

BACKGROUND OF INVENTION

Field of Invention

The present invention relates to a door regulation apparatus and a method of controlling the same. More particularly, the present invention relates to a door regulation apparatus and a method of controlling the same that can regulate a door in order to measure a gap/step with a vehicle body based on the door in a vehicle body transfer line and that can make a step of a specific portion of the door to zero.

Description of Related Art

In general, in a door installation process of a vehicle body transfer line, in a state in which a door hinge is mounted in a vehicle body, a door is mounted in the door hinge.

For example, in a door installation process, a door is not fixed to the vehicle body through a striker, in a state in which the door can freely rotate in the vehicle body by a door hinge, an assembly of the vehicle body is transferred to a post-process.

In a post-process of a door installation process, a cap and a step occurring between a door and a vehicle body portion that is related thereto are measured based on the door of a vehicle body assembly.

In such a gap/step measuring process, before measuring a gap and a step between the door and the vehicle body portion that is related thereto, in order to set a reference position of the door, it is necessary to make the step of the door to zero.

That is, in a door installation process, because a door is not fixed to a vehicle body through a striker but is assembled in a freely rotatable state in the vehicle body through a door hinge, in a gap/step measuring process, it is necessary to make a step of a specific portion of the door to zero.

However, in the conventional art, in a gap/step measuring process, a step of a specific portion of a door becomes zero with a worker's manual work, and in a state in which a reference position of the door is set to a vehicle body, a gap and a step between the door and a vehicle body portion that is related thereto are measured.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a door regulation apparatus and a method of controlling the same having advantages of automatically regulating a door to correspond to various vehicle types in a gap/step measuring process of a vehicle body assembly and making a step of a preset portion of the door to zero.

Various aspects of the present invention provide for a door regulation apparatus that positions a door that is mounted in a freely rotatably state in a vehicle body at a reference position in a gap/step measuring process and that makes a step of a preset portion of the door to zero, the door regulation apparatus including: i) a frame that is installed at the outside of a vehicle body transfer line; ii) a moving member that is installed to reciprocate forward and backward in the frame through a driving unit based on the door; iii) a clamping unit that is installed in the moving member and that vacuum adsorbs a skin surface of the door; iv) a sensor that is installed in the clamping unit and that senses a vacuum pressure operating at the skin surface of the door; v) a vision photographing unit that is installed in the moving member and that vision photographs a preset portion of the door; and vi) a control unit that analyzes and processes a sensing signal that receives from the sensor and vision data that acquires from the vision photographing unit to control the driving unit.

The driving unit may include a servo motor that is installed in the frame to correspond to the moving member; and a lead screw that connects the moving member and the servo motor.

The moving member may be slidably mounted in a rail plate that is provided in the frame.

The clamping unit may include at least one vacuum suction cup that is installed in the moving member; and a vacuum pump that is connected to the vacuum suction cup and that forms a vacuum pressure between the skin surface of the door and the vacuum suction cup.

The sensor may be installed at the inside of the vacuum suction cup.

The vision photographing unit may include a camera unit and a lighting unit that are installed in the moving member.

Various aspects of the present invention provide for a method of controlling a door regulation apparatus that positions a door that is mounted in a freely rotatably state in a vehicle body at a reference position in a gap/step measuring process and that makes a step of a preset portion of the door to zero, the method including: (a) moving a clamping unit forward to the door side through a moving member when an assembly in which the door is assembled enters the vehicle body; (b) sensing a vacuum pressure operating at a vacuum suction cup of the clamping unit and a skin surface of the door through a sensor; (c) determining whether a measured value that is sensed by the sensor satisfies a reference vacuum pressure, and stopping, if a measured value that is sensed by the sensor satisfies a reference vacuum pressure, a movement of the moving member, and vision photographing a preset portion of the door through a vision photographing unit; (d) acquiring and analyzing vision data of the vision photographing unit and determining whether a step exists at the preset portion of the door; and (e) moving, if a step exists at the preset portion of the door, the moving member forward or backward.

The method may further include applying a control signal to a servo motor of a driving unit for driving the moving member.

The method may further including releasing, if a step does not exist at the preset portion of the door, a vacuum pressure operating at the vacuum suction cup.

The method may further include releasing a vacuum pressure operating at the vacuum suction cup after measurement of a gap/step of a related portion of the door is complete.

Other aspects of the present invention provide for a method of controlling a door regulation apparatus that positions a door that is mounted in a freely rotatably state in a vehicle body at a reference position in a gap/step measuring process and that makes a step of a preset portion of the door to zero, the method including: regulating the door through a clamping unit and vision photographing the preset portion of the door through a vision photographing unit; determining whether a step exists at the preset portion of the door according to vision data of the vision photographing unit; and positioning, if a step exists at the preset portion of the door, the door at a reference position through the clamping unit.

In various aspects of the present invention, in a gap/step measuring process of a vehicle body line, a door can be automatically positioned at a reference position of a vehicle body, and a step of a preset portion of the door can become zero by feedback controlling by vision.

Therefore, in various aspects of the present invention, accuracy of step zero in a preset portion of a door can be improved, and accuracy and a processing speed of measurement of a gap/step of a vehicle body assembly can be further improved.

Further, in various aspects of the present invention, while determining a vacuum degree of a clamping unit through a sensor, a door can be clamped and thus a door regulation apparatus can correspond to restriction of various vehicle types having door parts of various deviations.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a flowchart illustrating an exemplary method of controlling a door regulation apparatus according to the present invention.

DETAILED DESCRIPTION

Figure 1:
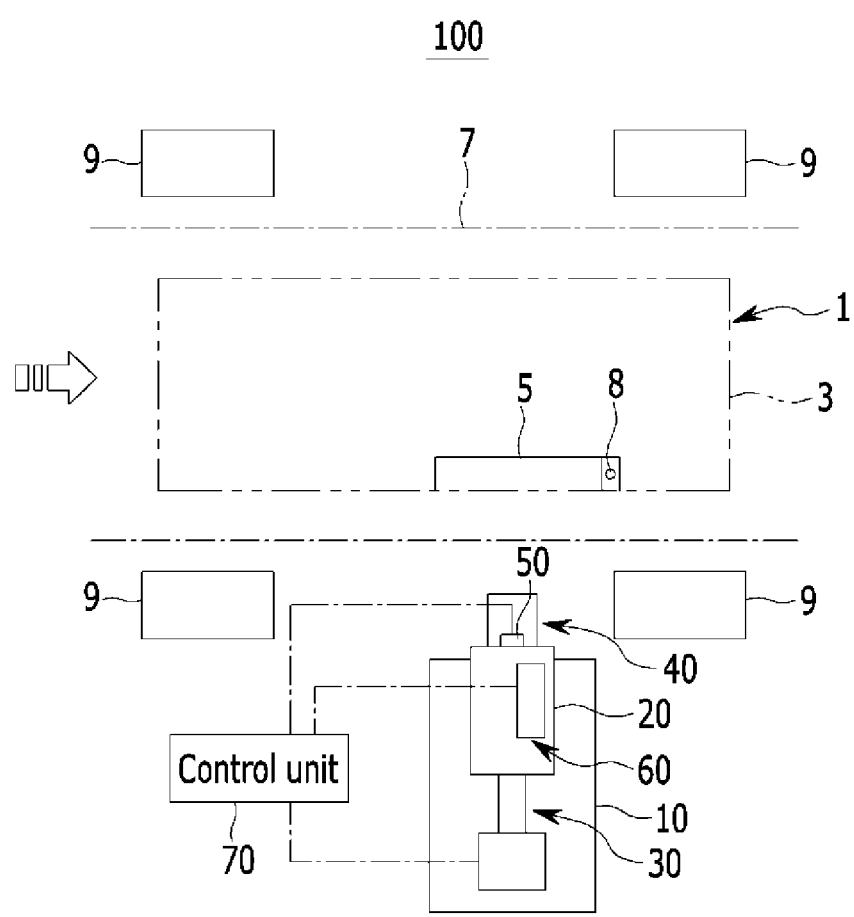
FIG. 1 is a block diagram illustrating an exemplary door regulation apparatus according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto. In the drawings, the thickness of layers, films, panels, regions, etc., are exaggerated for clarity.

In a detailed description, in order to distinguish constituent elements having the same configuration, a first, a second, etc., are used at names of the constituent elements, and the first, the second, etc., do not limit the order of the constituent elements.

In addition, in the entire specification, unless explicitly described to the contrary, the word "comprise" and variations such as "comprises" or "comprising", will be understood to imply the inclusion of stated elements but not the exclusion of any other elements.

In addition, the terms "unit", "means", "-er", and "member" described in the specification mean units for processing at least one function and operation.

FIG. 1 is a block diagram illustrating a door regulation apparatus according to various embodiments of the present invention.

Referring to FIG. 1, a door regulation apparatus 100 according to various embodiments of the present invention is applied to a vehicle body assembly line that mounts a door 5 at the side panel side of a vehicle body 3. Hereinafter, it is referred to as the vehicle body assembly 1 that the door 5 is assembled in the vehicle body 3.

For example, the door regulation apparatus 100 is used in a post-process of a door installation process and may be applied to a gap/step measuring process of measuring a gap and a step occurring between the door 5 and a vehicle body portion that is related to thereto based on the door 5 of the vehicle body assembly 1.

In a gap/step measuring process, with respect to the vehicle body assembly 1 that is transferred along a vehicle body transfer line 7, a gap and a step of entire areas of the vehicle body assembly 1 that is related to the door 5 may be measured through a plurality of gap/step measurement systems 9 that mount a vision sensor in a robot.

Here, in a state in which the door 5 is freely rotatably mounted in the vehicle body 3 through a door hinge 8 instead of being fixed to the vehicle body 3 through a striker, the vehicle body assembly 1 may be transferred to a gap/step measuring process along the vehicle body transfer line 7.

The door regulation apparatus 100 according to various embodiments of the present invention positions the door 5 at a reference position before measuring a gap and a step between the door 5 and the vehicle body assembly 1 that is related thereto through the gap/step measurement system 9 and makes a step of a preset portion of the door 5 to zero.

In the foregoing description, a preset portion of the door 5 is defined to a skin surface of a lower portion of a door handle in the door 5 (e.g., a front door), and a reference position of the door 5 is defined to a position at which a step does not occur between a front door and a rear door box.

In various embodiments of the present invention, a door regulation apparatus 100 that can automatically position the door 5 at a reference position to correspond to various vehicle types and that can make a step of a preset portion of the door 5 to zero by feedback controlling is provided.

Figure 2:
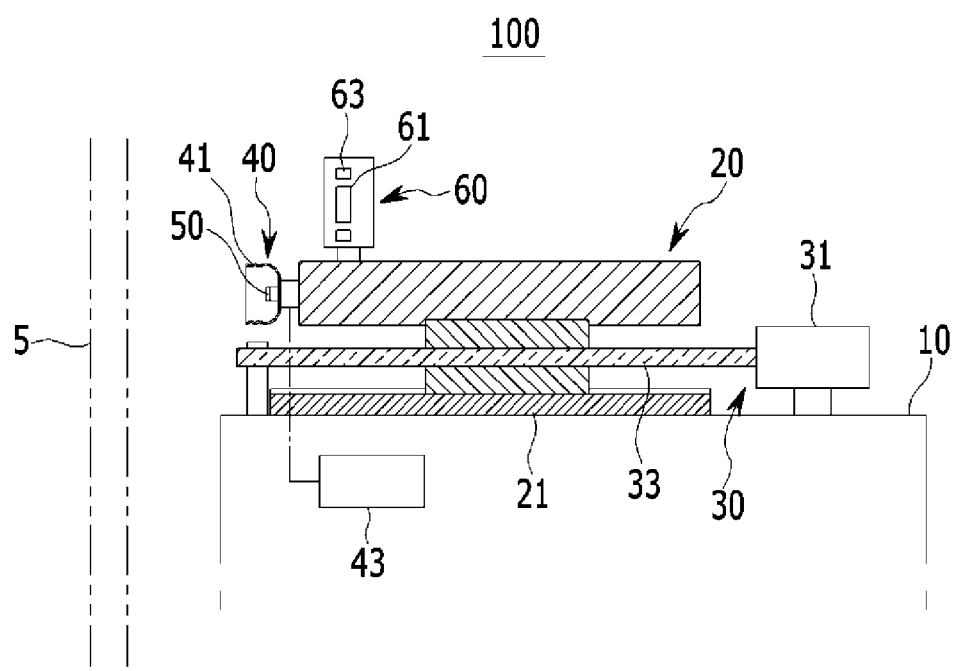
FIG. 2 is a side view illustrating a configuration of an exemplary door regulation apparatus according to the present invention.

FIG. 2 is a side view illustrating a configuration of a door regulation apparatus according to various embodiments of the present invention.

Referring to FIGS. 1 and 2, the door regulation apparatus 100 according to various embodiments of the present invention includes a frame 10, a moving member 20, a clamping unit 40, a sensor 50, a vision photographing unit 60, and a control unit 70.

The frame 10 is installed at the outside of the vehicle body transfer line 7. The frame 10 may be installed at a bottom surface of a workshop to correspond to doors of the right side and the left side of the vehicle body assembly 1.

The frame 10 supports the following various constituent elements and may have accessory elements such as various brackets, support blocks, plates, housings, covers, collars, and rods.

However, such accessory elements are used for installing each of constituent elements in the frame 10, and in an exemplary embodiment of the present invention, the accessory elements are referred to as the frame 10, except for an exceptional case.

The moving member 20 is installed to reciprocate forward and backward in the frame 10 based on the door 5 of the vehicle body assembly 1 that is transferred to a predetermined work position through the vehicle body transfer line 7.

Here, the moving member 20 is installed to reciprocate in a forward direction and a backward direction based on the door 5 in a rail plate 21 that is provided in the frame 10. The moving member 20 is slidably installed in the rail plate 21 through a driving unit 30 that is installed in the frame 10.

The driving unit 30 includes a servo motor 31 and a lead screw 33. The servo motor 31 is a motor that can control a rotating direction and a rotation speed and is installed to be fixed to the frame 10 to correspond to the moving member 20.

The lead screw 33 converts a rotational motion of the servo motor 31 to a linear motion of the moving member 20, is connected to a drive shaft of the servo motor 31, and is screw-coupled to the moving member 20.

Therefore, because the moving member 20 and the servo motor 31 are connected through the lead screw 33, the moving member 20 reciprocates in a forward and backward direction along the rail plate 21 by a rotation of a forward and backward direction of the servo motor 31.

The clamping unit 40 is used for clamping or gripping the door 5 of the vehicle body assembly 1. For example, as described above, the clamping unit 40 may vacuum absorb a preset portion of the door 5 that is defined by a skin surface of a lower portion of a door handle.

The clamping unit 40 includes at least one vacuum suction cup 41 that is installed in the moving member 20 and a vacuum pump 43 that forms a vacuum pressure between the skin surface of the door 5 and the vacuum suction cup 41.

The vacuum suction cup 41 is installed to be fixed to the moving member 20 to correspond to the skin surface of the door 5 and may be formed with a bellows type vacuum cup having space to form a vacuum pressure.

The vacuum pump 43 forms a vacuum pressure at inside space of the vacuum suction cup 41 and provides a vacuum inhalation force to the vacuum suction cup 41.

A connection structure of the vacuum suction cup 41 and the vacuum pump 43 is well-known technology that is widely known in the art, and therefore in this specification, a detailed description of a connection structure thereof will be omitted.

The sensor 50 senses a vacuum pressure operating between the skin surface of the door 5 and the vacuum suction cup 41 and outputs a sensing signal thereof to the control unit 70 to be described later.

The sensor 50 is installed at the inside of the vacuum suction cup 41 of the clamping unit 40. The sensor 50 may include a pressure sensor, a flow sensor, and a vacuum sensor of well-known technology that senses a vacuum pressure of predetermined close and seal space.

The vision photographing unit 60 vision photographs a preset portion of the door 5 and may be installed in the moving member 20 through a separate bracket.

The vision photographing unit 60 includes a camera unit 61 that vision photographs a preset portion of the door 5 and that outputs vision data thereof to the control unit 70 and a lighting unit 63 that radiates lightning light to the preset portion of the door 5.

The vision photographing unit 60 is an element of a vision system of well-known technology that is widely known in the art, and therefore in this specification, a detailed description of a configuration thereof will be omitted.

In the foregoing description, the control unit 70 controls general operations of the door regulation apparatus 100, analyzes and processes a sensing signal that is received from the sensor 50, and controls the servo motor 31 of the driving unit 30.

The control unit 70 analyzes and processes vision data that acquires from the vision photographing unit 60, determines whether a step exists at a preset portion of the door 5, and controls the servo motor 31 of the driving unit 30 according to whether a step exists.

Hereinafter, a method of controlling the door regulation apparatus 100 according to various embodiments of the present invention having the above-described configuration will be described in detail with reference to the accompanying drawings.

Figure 3:
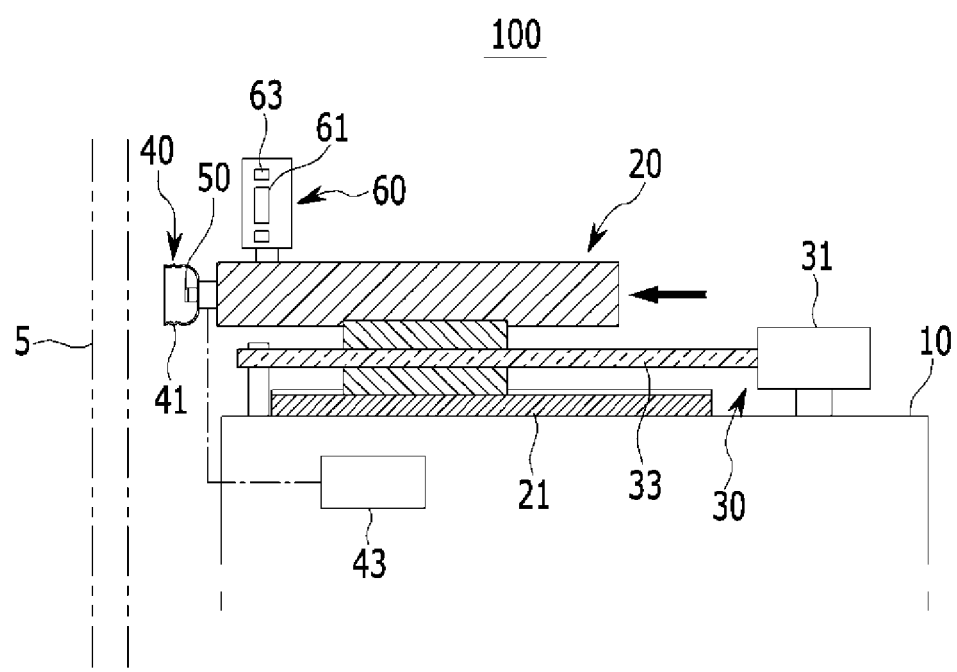
FIGS. 3 and 4 are block diagrams illustrating operation of an exemplary door regulation apparatus according to the present invention.
Figure 4:
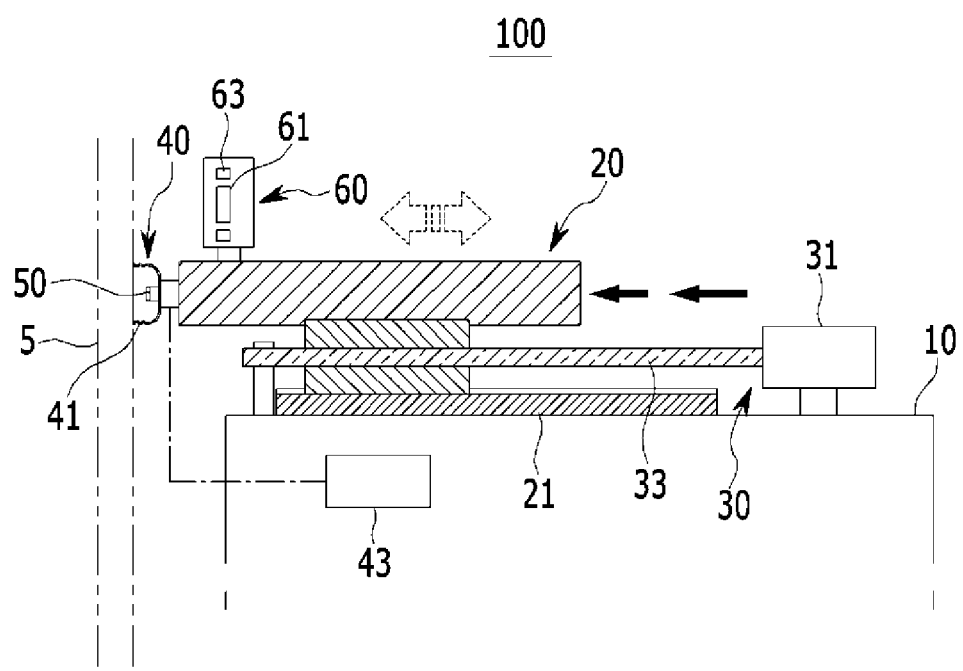

FIGS. 3 and 4 are block diagrams illustrating operation of a door regulation apparatus according to various embodiments of the present invention, and FIG. 5 is a flowchart illustrating a method of controlling a door regulation apparatus according to various embodiments of the present invention.

Referring to FIGS. 3 and 4, in various embodiments of the present invention, the vehicle body assembly 1 enters a gap/step measuring process along the vehicle body transfer line 7 (S11).

Thereafter, in various embodiments of the present invention, the control unit 70 controls the servo motor 31 of the driving unit 30 to move the moving member 20 forward to the door 5 side of the vehicle body assembly 1 (S12).

In the process, when an electrical control signal is applied to the servo motor 31 through the control unit 70, by rotating the lead screw 33 in one side direction by the servo motor 31, the moving member 20 may be moved forward. That is, the clamping unit 40 is moved forward to the door 5 side of the vehicle body assembly 1 through the moving member 20.

Here, in a state in which the door 5 is freely rotatably mounted in the vehicle body 3 through the door hinge 8 instead of being fixed to the vehicle body 3 through a striker, the vehicle body assembly 1 may be transferred to a gap/step measuring process along the vehicle body transfer line 7.

The vacuum pump 43 of the clamping unit 40 is operated by the control unit 70 and inhales air through the vacuum suction cup 41.

Thereafter, in various embodiments of the present invention, the moving member 20 is moved to the door 5 side, i.e., a preset portion of the door 5 of the vehicle body assembly 1.

Accordingly, the vacuum suction cup 41 of the clamping unit 40 vacuum adsorbs (clamps) a skin surface of a preset portion of the door 5 by a vacuum suction force by the vacuum pump 43.

In the process, in various embodiments of the present invention, as shown in FIGS. 3 and 5, a vacuum pressure operating between a skin surface of the door 5 and the vacuum suction cup 41 is sensed through the sensor 50, and a sensing signal thereof is output to the control unit 70 (S13).

Thereafter, the control unit 70 compares a measured value that is sensed by the sensor 50 and a reference vacuum pressure and determines whether the measured value satisfies the reference vacuum pressure (S14).

If the measured value by the sensor 50 satisfies the reference vacuum pressure, in various embodiments of the present invention, it is recognized that clamping of the clamping unit 40 for a skin surface of the door 5 is complete, and by applying a control signal to the servo motor 31 of the driving unit 30, a forward movement of the moving member 20 is stopped (S15).

Thereafter, in various embodiments of the present invention, the vision photographing unit 60 vision photographs a preset portion of the door 5 and outputs vision data thereof to the control unit 70 (S16).

Accordingly, the control unit 70 acquires vision data, compares and analyzes the vision data and preset reference data, and determines whether a step exists at a preset portion of the door 5 (S17).

If a step exists at a preset portion of the door 5, in various embodiments of the present invention, the control unit 70 controls the servo motor 31 of the driving unit 30 to move the moving member 20 forward or backward based on the door 5 (S18).

That is, in the process, when an electrical control signal is applied to the servo motor 31 through the control unit 70, by rotating the lead screw 33 in one side direction or another side direction by the servo motor 31, the moving member 20 is moved forward or backward.

Therefore, in various embodiments of the present invention, when a step exists in a preset portion of the door 5, a position of the door 5 may be varied by a forward and backward movement of the moving member 20.

In this case, the control unit 70 continues to acquire vision data through the vision photographing unit 60, compares and analyzes the vision data and preset reference data, and determines whether a step exists at a preset portion of the door 5 like step S17.

Thereby, in various embodiments of the present invention, a position of the door 5 is varied through the moving member 20, and by positioning the door 5 at a reference position of the vehicle body 3, a step of a preset portion of the door 5 may become zero.

In various embodiments of the present invention, if a step does not exist at a preset portion of the door 5 at step S17, the control unit 70 controls the vacuum pump 43 to release a vacuum pressure operating between the skin surface of the door 5 and the vacuum suction cup 41 (S20).

As described above, when a vacuum pressure is released, by applying an electrical control signal to the servo motor 31 through the control unit 70, the lead screw 33 is rotated in another one side direction by the servo motor 31 and thus the moving member 20 is returned to an original position.

Alternatively, in various embodiments of the present invention, as described above, before releasing a vacuum pressure of the clamping unit 40, a gap and a step of an entire area of the vehicle body assembly 1 that is related to the door 5 are measured through the gap/step measurement system 9 (S19), and measured data thereof may be fed back to a pre-process and a post-process of a gap/step measuring process.

By the door regulation apparatus 100 according to various embodiments of the present invention that is described above, in a gap/step measuring process, the door 5 can be automatically positioned at a reference position of the vehicle body 3 and by feedback controlling a step of a preset portion of the door 5 by vision, the step can become zero.

Therefore, in various embodiments of the present invention, accuracy of step zero at a preset portion of the door 5 can be improved, and accuracy and a processing speed of gap/step measurement of the vehicle body assembly 1 can be further improved.

Further, in various embodiments of the present invention, while determining a vacuum degree of the clamping unit 40 through the sensor 50, the door 5 can be clamped and thus a door regulation apparatus can correspond to various vehicle models whose door parts have various deviations.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a door regulation apparatus that positions a door mounted in a freely rotatably state in a vehicle body at a reference position in a gap/step measuring process and that makes a step of a predetermined portion of the door to zero, the method comprising:
    (a) moving a clamping unit forward to the door side through a moving member when an assembly in which the door is assembled enters the vehicle body;
    (b) sensing a vacuum pressure operating at a vacuum suction cup of the clamping unit and a skin surface of the door through a sensor;
    (c) determining whether a measured value sensed by the sensor satisfies a reference vacuum pressure, and stopping a movement of the moving member if a measured value sensed by the sensor satisfies a reference vacuum pressure, and vision photographing a predetermined portion of the door through a vision photographing unit;
    (d) acquiring and analyzing vision data of the vision photographing unit and determining whether a step exists at the predetermined portion of the door; and
    (e) moving the moving member forward or backward if a step exists at the predetermined portion of the door.

2. The method of claim 1, further comprising releasing a vacuum pressure operating at the vacuum suction cup if a step does not exist at the predetermined portion of the door.

3. The method of claim 2, further comprising releasing a vacuum pressure operating at the vacuum suction cup after measurement of a gap/step of a related portion of the door is complete.

4. The method of claim 1, further comprising applying a control signal to a servo motor of a driving unit for driving the moving member.

\* \* \* \* \*